United States Patent
Kim et al.

(10) Patent No.: US 10,285,043 B2
(45) Date of Patent: May 7, 2019

(54) ELECTRONIC DEVICE INCLUDING EUICC AND METHOD FOR OPERATING THE SAME

(71) Applicant: Samsung Electronics Co., Ltd., Gyeonggi-do (KR)

(72) Inventors: Sung Oh Kim, Incheon (KR); Jeong Don Kang, Suwon-si (KR); Sang Soo Lee, Suwon-si (KR); Sang Hwi Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/629,598

(22) Filed: Jun. 21, 2017

(65) Prior Publication Data
US 2017/0366962 A1    Dec. 21, 2017

(30) Foreign Application Priority Data
Jun. 21, 2016  (KR) ........................ 10-2016-0077429

(51) Int. Cl.
*H04M 3/00* (2006.01)
*H04W 8/18* (2009.01)
(Continued)

(52) U.S. Cl.
CPC ............. *H04W 8/18* (2013.01); *H04W 8/183* (2013.01); *H04W 48/16* (2013.01);
(Continued)

(58) Field of Classification Search
CPC ....... H04W 8/18; H04W 8/183; H04W 48/16; H04W 28/0215; H04W 52/0264;
(Continued)

(56) References Cited

U.S. PATENT DOCUMENTS

| | | | |
|---|---|---|---|
| 2009/0217364 A1* | 8/2009 | Salmela ................ | H04W 12/06 726/6 |
| 2011/0035584 A1* | 2/2011 | Meyerstein ........... | H04W 8/265 713/155 |

(Continued)

FOREIGN PATENT DOCUMENTS

| | | | | |
|---|---|---|---|---|
| EP | 3016419 A1 * | 5/2016 | ............ | H04W 8/265 |
| EP | 3016419 A1 * | 5/2016 | ............ | H04W 8/265 |

(Continued)

OTHER PUBLICATIONS

Extended European Search Report,dated Sep. 12, 2017, regarding Application No. EP17177243.7, 12 pages.

(Continued)

*Primary Examiner* — Mahendra Patel (57) ABSTRACT

An electronic device is provided. The electronic device includes at least one processor and an embedded universal integrated circuit card (eUICC) configured to be electrically connected with the at least one processor. The at least one processor is configured to implement a management module configured to manage a profile stored in the eUICC. The management module is configured to, when there is an enabled profile in the eUICC, perform a communication function based on the enabled profile and, when there is no the enabled profile in the eUICC, disable at least one of a periodic eUICC verification function and a network search function.

19 Claims, 7 Drawing Sheets

(51) Int. Cl.
*H04W 48/16* (2009.01)
*H04W 28/02* (2009.01)
*H04W 52/02* (2009.01)
*H04W 88/02* (2009.01)

(52) U.S. Cl.
CPC .... *H04W 28/0215* (2013.01); *H04W 52/0264* (2013.01); *H04W 88/02* (2013.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/20* (2018.01); *Y02D 70/26* (2018.01)

(58) Field of Classification Search
CPC ....... H04W 88/02; H04W 4/00; H04W 84/12; H04W 12/04; H04W 8/24; H04W 12/08; H04W 8/20; H04M 2215/2033; H04B 1/3816; H04L 29/06; H04L 29/08; H04L 9/08; H04L 63/102; H04L 67/306
USPC .......... 455/418, 558, 411, 419; 726/9, 7; 1/1
See application file for complete search history.

(56) References Cited

U.S. PATENT DOCUMENTS

| | | | |
|---|---|---|---|
| 2011/0130117 A1* | 6/2011 | Fan | H04M 15/00 455/411 |
| 2012/0190354 A1* | 7/2012 | Merrien | H04W 4/70 455/422.1 |
| 2014/0373117 A1* | 12/2014 | Le Saint | G06F 21/33 726/6 |
| 2015/0281964 A1* | 10/2015 | Seo | H04L 63/102 726/9 |
| 2015/0319133 A1 | 11/2015 | Seo et al. | |
| 2016/0020804 A1* | 1/2016 | Lee | H04B 1/3816 455/558 |
| 2016/0080932 A1* | 3/2016 | Jin | H04W 8/183 455/418 |
| 2016/0301529 A1* | 10/2016 | Park | H04W 12/10 |

FOREIGN PATENT DOCUMENTS

| | | | | |
|---|---|---|---|---|
| KR | 20140039965 A | | 4/2014 | |
| WO | WO 2011080637 A1 | * | 7/2011 | ............ H04M 15/00 |
| WO | WO-2011080637 A1 | * | 7/2011 | ............ H04M 15/00 |
| WO | WO 2013124708 A1 | * | 8/2013 | ............. H04W 4/24 |
| WO | WO-2013124708 A1 | * | 8/2013 | ............. H04W 4/24 |

OTHER PUBLICATIONS

GSM Association, "SGP.22—RSP Technical Specification", Version 1.1, Jun. 2016, 125 pages. http://www.gsma.com/newsroom/wp-content/uploads/SGP.22_v1.1.pdf.

* cited by examiner

ELECTRONIC DEVICE INCLUDING EUICC AND METHOD FOR OPERATING THE SAME

CROSS-REFERENCE TO RELATED APPLICATIONS AND CLAIM OF PRIORITY

This application claims the benefit under 35 U.S.C. § 119(a) of a Korean patent application filed on Jun. 21, 2016, in the Korean Intellectual Property Office and assigned Serial number 10-2016-0077429, the entire disclosure of which is hereby incorporated by reference.

TECHNICAL FIELD

The present disclosure relates to technologies for controlling operations associated with enabling profiles of an electronic device into which an embedded universal integrated circuit card (eUICC) is loaded.

BACKGROUND

A user terminal such as a smartphone may support wireless communication. The user terminal may include a subscriber identity module (SIM) for identifying a user in a network. In general, the SIM may be inserted into a terminal or may be separated from the terminal. If the SIM is separated from the terminal (i.e., if there is no SIM inserted into the terminal), the terminal may be in a "NO SIM" state. The terminal in the "NO SIM" state may provide only a limited service such as an emergency call.

Meanwhile, in addition to the SIM or alternatively, an embedded SIM (eSIM) which is soldered onto the terminal and is impossible to be inserted/separated into/from the terminal may be used. A terminal having the eSIM may download a profile of a mobile network operator (MNO) using over-the-air (OTA) to use a mobile communication service of the MNO and may enable the profile. The SIM/eSIM may be referred to as a universal integrated circuit card (UICC)/eUICC.

Since the eSIM is soldered onto a terminal contrary to a conventional SIM, the terminal into which the eSIM is loaded may fail to be in the "NO SIM" state in view of hardware. However, since the eSIM uses a manner of downloading a profile, installing the profile in the eSIM, and enabling the profile, only one profile may fail to be installed in the eSIM or installed all profiles may be disabled.

According to currently related standards, if there is an enabled profile in the eSIM, the eSIM should ensure to provide a default file system to a terminal (refer to a section 3.4.3 eUICC file structure of an SGP.22—RSP technical specification v.1.0 document). If receiving the default file system, the terminal may determine that there is a valid SIM. In this case, the terminal may perform an operation of transmitting a polling command to the eSIM on a periodic basis and verifying whether there is an available SIM (e.g., an international mobile subscriber identity (IMSI) value) and an operation of searching for an available network.

According to the related art, since the terminal having the eSIM performs an operation of transmitting a polling command or searching for a network although it is in the "NO SIM state" actually, unnecessary power consumption may occur. Further, in view of an MNO, unnecessary load may occur in a network due to a network search operation of the terminal.

SUMMARY

To address the above-discussed deficiencies, it is a primary object to provide at least the advantages described below. Accordingly, an aspect of the present disclosure is to provide technologies for processing a NO SIM state of a terminal into which an eSIM is loaded.

In accordance with an aspect of the present disclosure, an electronic device is provided. The electronic device may include at least one processor and an embedded universal integrated circuit card (eUICC) configured to be electrically connected with the at least one processor. The at least one processor may configured to implement a management module configured to manage a profile stored in the eUICC. The management module may be configured to, if there is an enabled profile in the eUICC, perform a communication function based on the enabled profile and, if there is no the enabled profile in the eUICC, disable at least one of a periodic eUICC verification function and a network search function.

In accordance with another aspect of the present disclosure, a method for operating a terminal having an embedded universal integrated circuit card (eUICC) is provided. The method may include determining whether there is an enabled profile in the eUICC, if there is the enabled profile in the eUICC, performing a communication function based on the enabled profile, and, if there is no the enabled profile in the eUICC, disabling at least one function.

In accordance with another aspect of the present disclosure, an electronic device is provided. The electronic device may include an application processor, a communication processor, a radio frequency (RF) circuit configured to be electrically connected with the communication processor, and an eUICC configured to be electrically connected with the communication processor and store at least one profile received from a server via the RF circuit. The communication processor may be configured to, if there is no enabled profile in the eUICC, disable at least one of a periodic eUICC verification function and a network search function.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

In this disclosure, the expressions "have", "may have", "include" and "comprise", or "may include" and "may comprise" indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or the priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by those skilled in the art. It will be further understood that terms, which are defined in a dictionary and commonly used, should also be interpreted as being customary in the relevant art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, and Google TV™), game consoles (e.g., Xbox™ and PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/ structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

Figure 1:
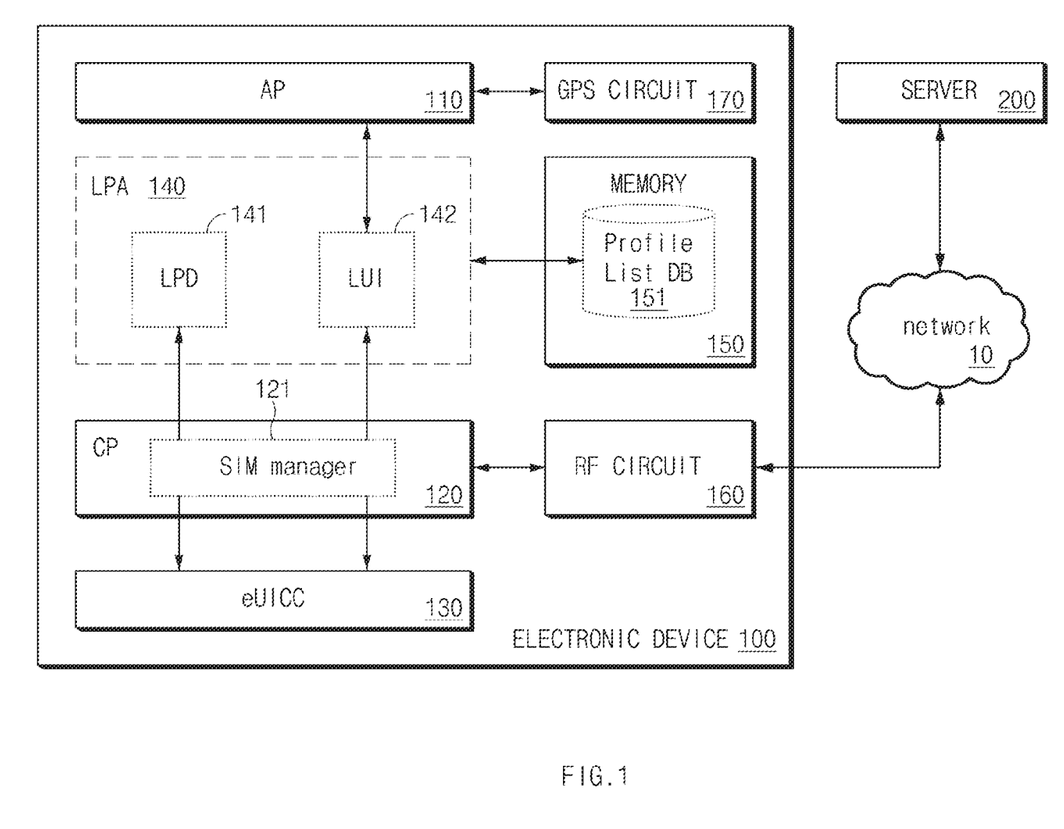
FIG. 1 is a block diagram illustrating hardware and software modules of an electronic device according to an embodiment.

FIG. 1 is a block diagram illustrating hardware and software modules of an electronic device according to an embodiment.

Referring to FIG. 1, an electronic device 100 may include an application processor (AP) 110, a communication processor (CP) 120, an embedded universal integrated circuit card (eUICC) 130, a memory 150, a radio frequency (RF) circuit 160, and a global positioning system (GPS) circuit 170. The electronic device 100 shown in FIG. 1 may be an example of a terminal for implementing various embodiments, and some of the elements of the electronic device 100 may be omitted to configure the terminal, or other elements may be further included in the electronic device 100 to configure the terminal.

The electronic device 100 may be understood as a user terminal, a user device, user equipment (UE), a terminal, or the like. The electronic device 100 may communicate with a server 200 over a network 10. The network 10 may correspond to a wireless network such as a cellular network or wireless-fidelity (Wi-Fi). The server 200 may correspond to at least one server operated by a mobile network operator (MNO) which provides a profile to be installed in the eUICC 130. However, if the electronic device 100 uses a general communication function (e.g., the Internet), the server 200 may be understood as a server which provides the function, a webpage, or the like.

The electronic device 100 may include at least one processor. For example, the electronic device 100 may include the AP 110 and the CP 120. The AP 110 and the CP 120 may be electrically connected with each other. In an embodiment, the AP 110 and the CP 120 may be implemented as one integrated chip, for example, a system on chip (SoC) or the like. The AP 110 and/or the CP 120 may implement a software module for implementing a method for operating the electronic device 100 according to an embodiment. For example, the AP 110 and the CP 120 may implement a local profile assistant (LPA) 140. Further, the CP 120 may implement a subscriber identity module (SIM) manager 121 which controls a function associated with the eUICC 130. In other words, the at least one processor may implement a management module for storing a profile in the eUICC 130 or managing the stored profile.

The electronic device 100 may include the eUICC 130. The eUICC 130 may correspond to a SIM which is impossible to be separated from the electronic device 100. The eUICC 130 may be understood as an embedded SIM (eSIM), an embedded secure element (eSE), or the like. The eUICC 130 may be electrically connected with the CP 120.

The eUICC 130 may include a controller and a storage. One or more profiles may be installed in the storage of the eUICC 130. For example, a profile of a first MNO, a profile of a second MNO, a profile of a third MNO, and the like may be installed in the eUICC 130. The controller of the eUICC 130 may control the eUICC 130 such that the CP 120 (or the SIM manager 121) accesses a profile enabled among a plurality of profiles. For example, the eUICC 130 may include an eUICC operating system (OS), an issuer security domain root (ISD-R), and an ISD profile (ISD-P). The ISD-R may generate a new ISD-P and may manage a lifecycle of all ISD-Ps. The ISD-P may be a kind of a secure container and may be used to download and install a profile. In other words, a profile package downloaded from the server 200 may be stored/installed in an ISD-P domain.

The electronic device 100 may include the memory 150. Instructions and data may be stored in the memory 150. For example, an instruction (e.g., a program code) for the at least one processor to implement a software module may be stored in the memory 150. Further, a profile list database (DB) 151 may be stored in the memory 150. For example, the LPA 140 may obtain a list of installed profiles, a state (e.g., an enabled/disabled state) of each of the profiles, and use information of each of the profiles (e.g., a remaining amount of voice call, a remaining amount of data, a tariff, or the like) from the eUICC 130 and may store the profile list DB 151 including the obtained information in the memory 150.

The electronic device 100 may include at least one communication circuit for performing a communication function. The GPS circuit 170 for ascertaining a location of the electronic device 100 may be included in the electronic device 100. The communication circuit may be electrically connected with the AP 110 or the CP 120. The GPS circuit 170 may be directly connected with the AP 110. The electronic device 100 may include the RF circuit 160. The RF circuit 160 may generally refer to a cellular RF block for communicating with a cellular network based on a profile stored in an eUICC in the present disclosure, but may include a Wi-Fi RF block for communicating with a Wi-Fi network based on a profile stored in an eUICC and/or an RF block for supporting various communication modes (e.g., Bluetooth, Bluetooth low energy (BLE), near field communication (NFC), magnetic stripe transmission (MST), a wireless charging circuit, and the like) supported by the electronic device 100. It may be understood that the RF block includes an antenna radiator, a filter, a switch, an amplifier such as a low noise amplifier (LNA) or a power amplifier (PA), and the like.

In FIG. 1, elements implemented with hardware may be represented by solid lines, and elements implemented or implementable with software may be represented by dotted lines. For example, the LPA 140, the SIM manager 121, and the profile list DB 151 may be implemented with software. Instructions for implementing software may be stored in the memory 150 or may be hard-coded in the processor (e.g., the AP 110 or the CP 120). In other words, in the present disclosure, an operation described as being performed by a software module may be understood as being performed by a processor which drives the software module.

Further, elements connected by arrows in FIG. 1 may exchange data or instructions with each other. However, an association of FIG. 1 may be an example for helping convenience of description, and there may be a connection reasonable to those skilled in the art between elements which are not connected by arrows in FIG. 1. It is obvious that the AP 110 may directly access the memory 150.

The LPA 140 may include a local profile download (LPD) 141 and a local user interface (LUI) 142. Each of the LPD 141 and the LUI 142 may be understood as a sub-software module included in the LPA 140. The LPA 140 may further include additional sub-software module, but only the LPD 141 and the LUI 142 may be described in the present disclosure for preventing the scope and spirit of the inventive concept from being blurred.

The LPD 141 may perform a function of downloading a profile from the server 200. For example, for the electronic device 100 to access a cellular network provided from an MNO, a profile corresponding to the MNO should be installed in the eUICC 130. The LPD 141 may download a profile package from the server 200 using over-the-air (OTA) and may provide the profile package to the eUICC 130 through an interface (e.g., ES10b) between the LPD 141 and the eUICC 130.

The LUI 142 may perform a function of providing a user interface (UI) such that a user (e.g., an end-user) manages a profile managed in the eUICC 130 and transmitting an input provided from the user through the UI to the eUICC 130. A user input obtained on a touch display or the like of the electronic device 100 may be processed by the AP 110 and may be transmitted to the LUI 142 through an interface (e.g., ESeu) between the AP 110 and the LUI 142. The LUI 142 may transmit a user input associated with managing a profile (e.g., downloading the profile, enabling the profile, disabling the profile, deleting the profile, listing profiles, adding the profile, adding/updating a profile nickname, or the like) to the eUICC 130 through an interface (e.g., ES10c) between the LUI 142 and the eUICC 130. In an embodiment, an instruction/message transmitted from the LPA 140 to the eUICC 130 may be processed by the SIM manager 121 or may bypass the SIM manager 121.

The SIM manager 121 may transmit the instruction/message to the eUICC 130 and may read elementary file (EF) information from the eUICC 130. Herein, the EF may correspond to a file including access conditions and the like of an application stored in the eUICC 130 (e.g., a specific ISD-P of the eUICC 130). A description associated with this will be given below with reference to FIG. 2.

In an embodiment, the SIM manager 121 may include the LPA 140 or may operate to be independent of the LPA 140. For example, as shown in FIG. 1, if the SIM manager 121 and the LPA 140 are separated from each other, an instruction associated with managing a profile transmitted from the LPA 140 may be transmitted to the eUICC 130 via the SIM manager 121.

Figure 2:
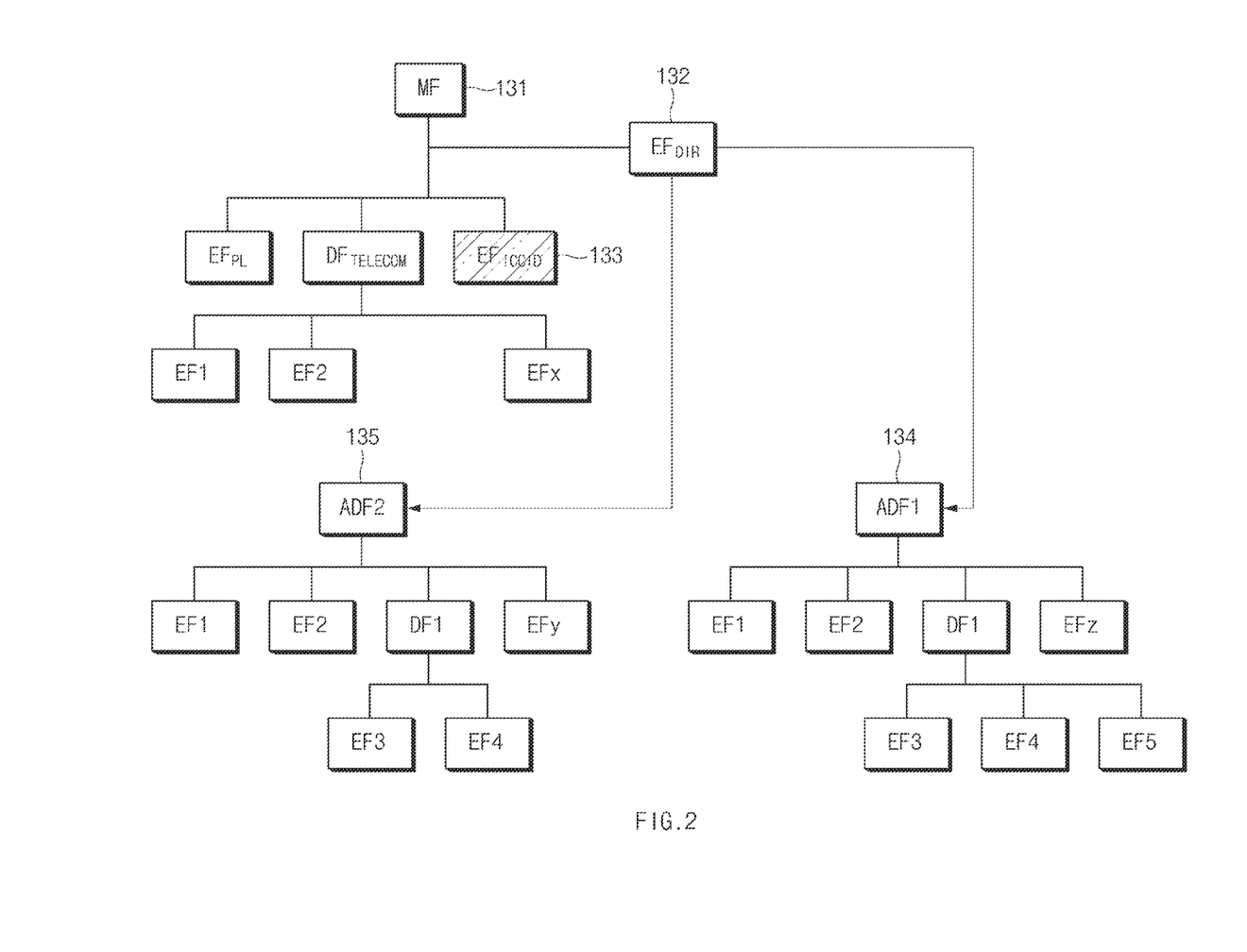
FIG. 2 is a drawing illustrating a file system of a profile installed in an embedded universal integrated circuit card (eUICC) according to an embodiment.

FIG. 2 is a drawing illustrating a file system of a profile installed in an eUICC according to an embodiment.

Referring to FIG. 2, a file system of a profile installed in an eUICC 130 of FIG. 1 may include files such as a master file (MF) 131, an EF (e.g., an $EF_{DIR}$ 132, an $EF_{ICCID}$ 133, an $EF_{ARR}$, an $EF_{IMSI}$, or the like), a dedicated file (DF) (e.g., a $DF_{TELECOM}$ or the like), and an application DF (ADF) (e.g., an ADF1 134, an ADF2 135, or the like). The file system may be understood as a UICC application structure.

At least some of items included in the file system of the profile may be mandatory. For example, the $EF_{DIR}$ 132, an $EF_{PL}$ (not shown), an $EF_{ICCID}$ 133, and the like may be defined as items which should be included in the file system. Further, such items may be defined as directly under items of the MF 131.

At least some of the items included in the file system of the profile may be optional. For example, there may be no item such as the $DF_{TELECOM}$ in the file system.

If the eUICC 130 is recognized, an electronic device 100 of FIG. 1, for example, an LPA 140 of FIG. 1 may verify ADF information stored in the $EF_{DIR}$ 132 of the profile. For example, the LPA 140 may select a proper application based on an application identifier (AID) included in the ADF information. For example, if an ADF defined in the $EF_{DIR}$ 132 indicates the ADF1 134, the LPA 140 may use information stored in the ADF1 134. If the ADF defined in the $EF_{DIR}$ 132 indicates the ADF2 135, the LPA 140 may use information stored in the ADF2 135.

If there is no profile installed in the eUICC 130 or if installed all profiles are disabled, the eUICC 130 may provide a default file system to the LPA 140. According to an embodiment, the default file system may have the same or similar structure to the file system of FIG. 2. The LPA 140 may determine whether information included in the default file system provided from the eUICC 130 meets a specified condition. For example, the LPA 140 may use a value of specific information included in the file system to determine whether the file system provided from the eUICC 130 is a file system of an enabled profile or the default file system. For example, if a value included in the EF_ICCID 133 corresponds to a predefined value, the LPA 140 may determine that a provided file system is a default file system provided when there is no enabled profile in the eUICC 130. In addition to examples disclosed in the present disclosure, a value of specific information of a predefined EF may be used to determine a default file system.

Further, the file system may include subscriber identification information such as an international mobile subscriber identity (IMSI). The IMSI include a public land mobile network (PLMN) ID and a mobile subscription identification number (MSIN). If a PLMN ID of an IMSI of the provided file system meets a predefined value (e.g., 00101) (e.g., a PLMN ID value corresponding to a default file system), the LPA 140 may determine that there is no enabled profile. Additionally or alternatively, if a combination of the PLMN ID and/or an MSIN of the IMSI of the provided file system meets a predefined value or if the IMSI meets the predefined value, the LPA 140 may determine that there is no enabled profile.

In addition, according to another embodiment, the LPA 140 may recognize the fact that there is no enabled profile in the eUICC 130 using various methods. Hereinafter, a description will be given of a method for determining whether there is an enabled profile and an operation performed by the electronic device 100 when the electronic device 100 recognizes the fact that there is no enabled profile in the eUICC 130.

Figure 3:
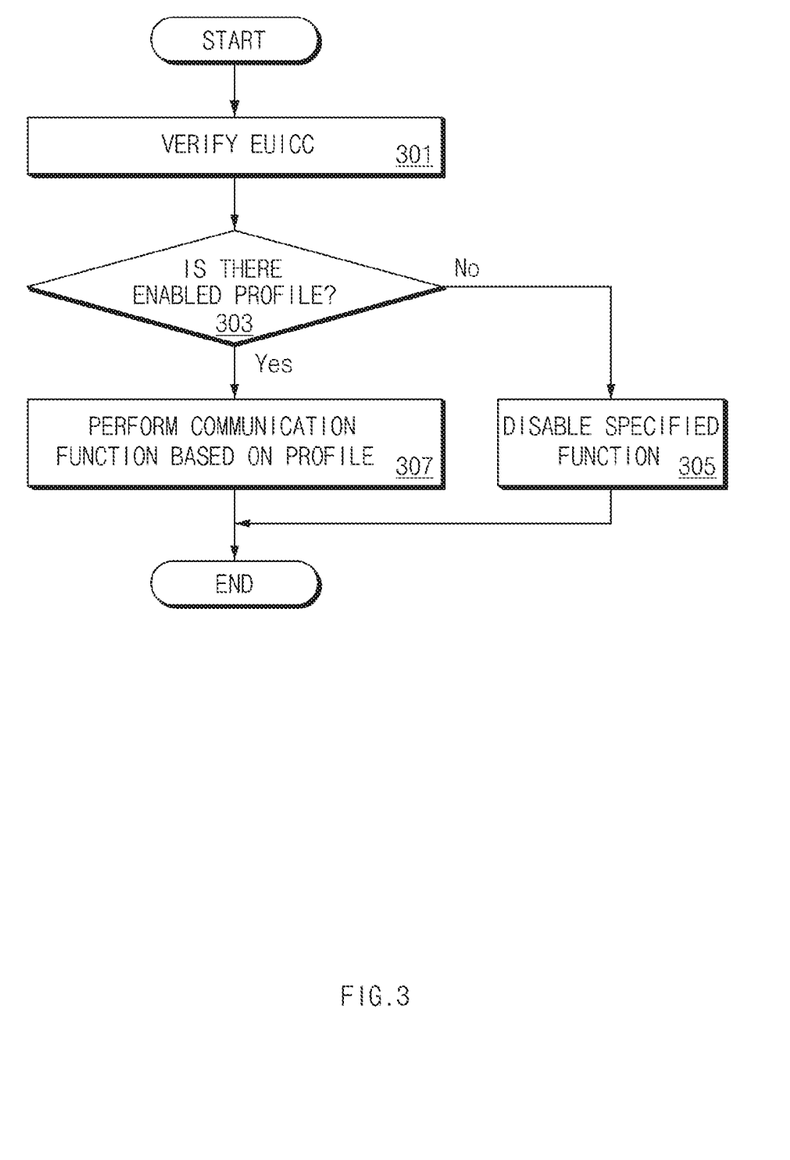
FIG. 3 is a flowchart illustrating a method for operating an electronic device according to an embodiment.

FIG. 3 is a flowchart illustrating a method for operating an electronic device according to an embodiment.

Referring to FIG. 3, in operation 301, a management module (e.g., an LPA 140) of an electronic device 100 of FIG. 1 may verify an eUICC 130 of FIG. 1. For example, if a profile is installed or deleted from the eUICC 130, if the profile is enabled or disabled, if the electronic device 100 is changed from a power-off state to a power-on state, if an airplane mode is released, if the electronic device 100 departs from a shadow area, if the electronic device 100 departs from an out of service (OOS), or if a user input for allowing the electronic device 100 to verify the eUICC 130 is generated via, for example, an LUI 142 of FIG. 1, the electronic device 100 may verify a profile installed in the eUICC 130.

In operation 303, the management module may determine whether there is an enabled profile in the eUICC 130. In an embodiment, the management module may determine whether there is an enabled profile in the eUICC 130, based on whether information included in a file system provided from the eUICC 130 meets a specified condition.

In another embodiment, the management module may obtain information about a profile stored in the eUICC 130 using a specific command. For example, the LPA 140 may obtain a list of profiles installed in the eUICC 130 and information about a current state (e.g., an enabled or disabled state) of each of the profiles.

In the above embodiment, the management module may obtain information about a profile stored in the eUICC 130 to form a profile list DB 151 of FIG. 1. For example, if a management event in which a profile is installed, enabled, deleted, or disabled in the eUICC 130 is generated, the management module may update state information about the profile in the profile list DB 151. The management module may communicate with a memory 150 of FIG. 1 and may verify a current state of each of profiles installed in the eUICC 130.

If all profiles included in a profile list are disabled or if there is no profile installed in the eUICC 130 (i.e., if only one profile is not included in the profile list), the management module may determine that there is no enabled profile in the eUICC 130.

In another embodiment, if there is no enabled profile in the eUICC 130, the eUICC 130 may transmit a status word indicating that there is no the enabled profile in the eUICC 130 to the management module. If receiving the status word, the management module may determine that there is the no enabled profile.

If it is determined that there is no the enabled profile in the eUICC 130, in operation 305, the electronic device 100 may disable a specified function. For example, a conventional user terminal may determine a current state as an available SIM state in a state where a SIM is inserted into its electronic device, and may search for each radio access technology (RAT) using registered PLMN information. Thereafter, the electronic device 100 may search for each RAT using home PLMN (HPLMN) information obtained from the SIM and may perform a network search by an order of a PLMN list generated by combining a plurality of information of EF_H-PLMN selector with access technology (EF_HPLM-NwAcT), EF user controlled PLMNwAcT (EF_PLM-NwAcT), EF_operator controlled PLMNwAcT (EF_OPLMNwAcT), and the like. When a normal service is unavailable as a result of the network search (e.g., if there is no profile installed in the SIM although the SIM is inserted or if an installed profile is unavailable), the user terminal may perform limited camping and may provide a limited service (e.g., an emergency call or the like). In this state, the user terminal may attempt to continue performing a network search on a periodic basis to provide a normal service. However, according to an embodiment disclosed in the present disclosure, if it is determined that there is no enabled profile in the eUICC 130, the electronic device 100 may disable a network search function in a limited camping state. If the electronic device 100 does not access a network of a normal MNO although it performs a network search if there is no enabled profile in the eUICC 130, it may save power consumption depending on an unnecessary network search operation by disabling a network (available RAT) search function. Further, in view of an MNO, network load generated when the electronic device 100 attempts to continue performing network registration may be reduced by disabling a network search function.

Further, the conventional user terminal may transmit a control message (e.g., a polling command) for continuously verifying an operation state of the SIM in a state where the SIM is inserted into the electronic device, thus resulting in unnecessary power consumption. However, according an embodiment, it is determined that there is no enabled profile in the eUICC 130, the electronic device 100 may disable a control message transmission function. Therefore, the electronic device 100 may save power consumption by an unnecessary operation.

If there is the enabled profile, in operation 307, the electronic device 100 may perform a communication function based on the enabled profile. For example, the electronic device 100 may access a network of an MNO depending on an IMS value corresponding to the profile.

Figure 4:
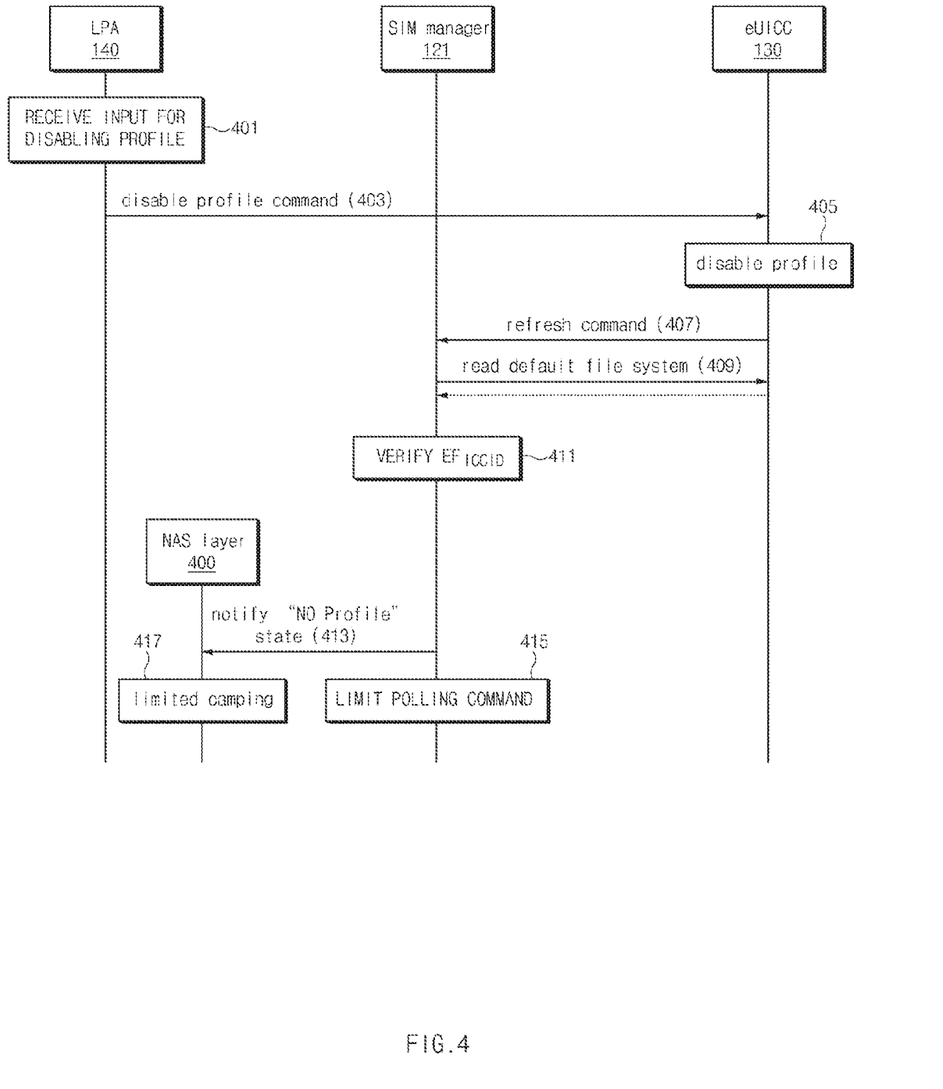
FIG. 4 is a signal sequence diagram illustrating an operation performed when all of profiles of the electronic device are disabled, according to an embodiment.

FIG. 4 is a signal sequence diagram illustrating an operation performed when all of profiles of the electronic device are disabled, according to an embodiment.

Referring to FIG. 4, in operation 401, an LPA 140 may receive an input for disabling a profile. This input may be input from an end-user. For example, the user may provide an input for disabling a currently enabled profile on a setup screen displayed on a display of an electronic device 100 of FIG. 1. For convenience of description, it is assumed that only one profile is currently enabled in the electronic device 100.

If receiving the user input, in operation 403, an LUI 142 of the LPA 140 may transmit the user input or a command generated based on the user input to an eUICC 130. This command may be processed by a SIM manager 121 and may then be transmitted to the eUICC 130, or may bypass the SIM manager 121 and may then be transmitted to the eUICC 130.

In operation 405, the eUICC 130 may disable the enabled profile. For example, a controller or an ISD-R of the eUICC 130 may disable an ISD-P corresponding to the profile. Now, all profiles installed in the eUICC 130 may correspond to a disabled state.

In operation 407, the eUICC 130 may transmit a refresh command to the SIM manager 121 to refresh. Receiving the refresh command, the SIM manager 121 or a CP 120 of FIG. 1 may be a hardware/software module associated with the profile and may update information indicating that the profile is disabled.

In operation 409, the SIM manager 121 may query the eUICC 130 whether there is an enabled profile to use a network service. Since there is no enabled profile currently in the eUICC 130, the SIM manager 121 may read a default file system from the eUICC 130.

In operation 411, the SIM manager 121 may verify an EF_ICCID value of the default file system. In general, the SIM manager 121 may verify information predefined in a file system and may determine whether the file system read in operation 409 is a file system of an enabled profile or a default file system provided from the eUICC 130, depending on a value of the predefined information. In an example of operation 411, the EF_ICCID value may be replaced with another information described with reference to FIGS. 2 and 3. In an example of FIG. 4, it is assumed that the EF_ICCID value has a value corresponding to the default file system.

In operation 413, the SIM manager 121 may determine that there is no enabled profile in the eUICC 130 and may notify a "NO profile" state indicating that there is not currently enabled profile to the a non-access stratum (NAS) layer 400 which performs a network search function in a protocol stack of a cellular module. The NAS layer 400 may be controlled by the CP 120. Since there is no enabled profile, the NAS layer 400 may be changed to a "No IMSI state" and may attempt to perform limited camping. Herein, the "No IMSI state" may correspond to a No IMSI state defined in the ETSI TS-124 008 specification. In the "No IMSI state", the NAS layer 400 may provide only a limited service such as an emergency call while camping on a cell accessible from a location of the electronic device 100. Herein, as described in operation 305 of FIG. 3, a network available in this state may fail to be searched for.

In operation 415, the SIM manager 121 may limit a polling command for verifying a state of the eUICC 130 (e.g., whether there is an enabled profile). Herein, the meaning of limiting the polling command may include an operation of turning off the polling function itself or an operation of changing a polling interval time through a polling interval command to be relatively longer. At least one processor (or the LPA 140) may transmit the polling command to the eUICC 130 at a predefined interval time and may verify a profile, thus reduce current consumption by not transmitting the polling command or lengthening an interval time when the polling command is transmitted.

Figure 5:
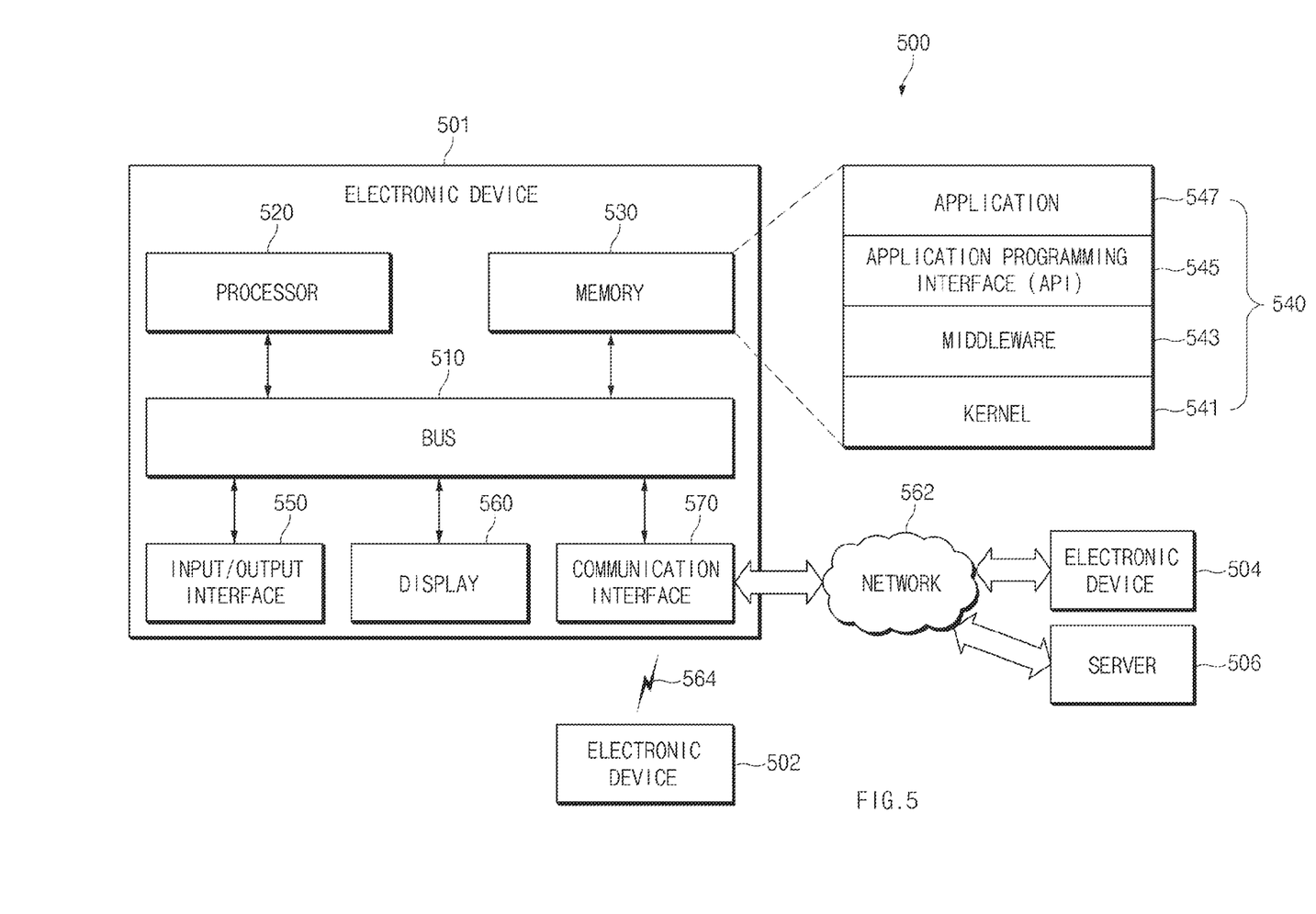
FIG. 5 illustrates a block diagram of an electronic device in a network environment, according to various embodiments.
Figure 6:
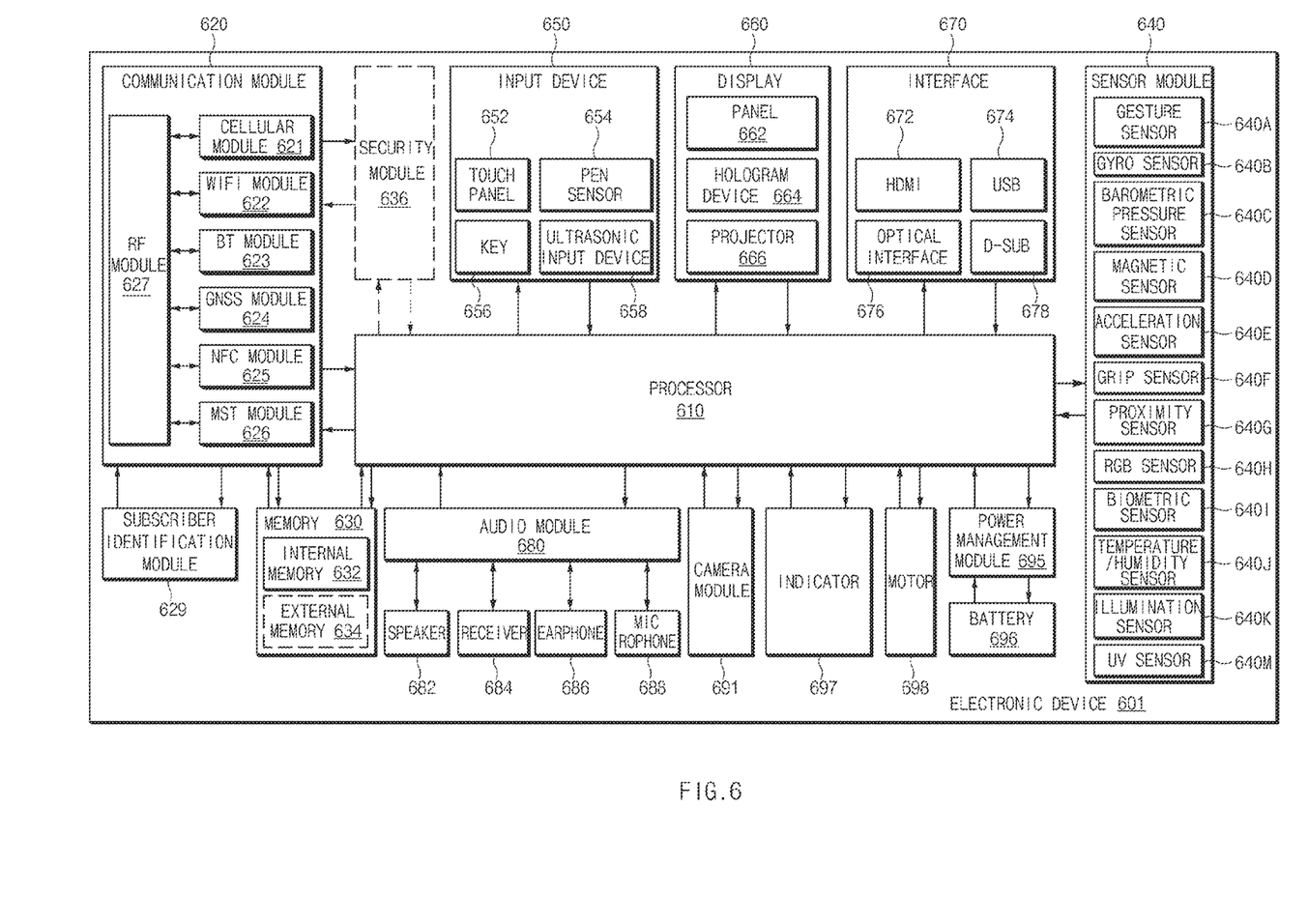
FIG. 6 illustrates a block diagram of an electronic device, according to various embodiments.
Figure 7:
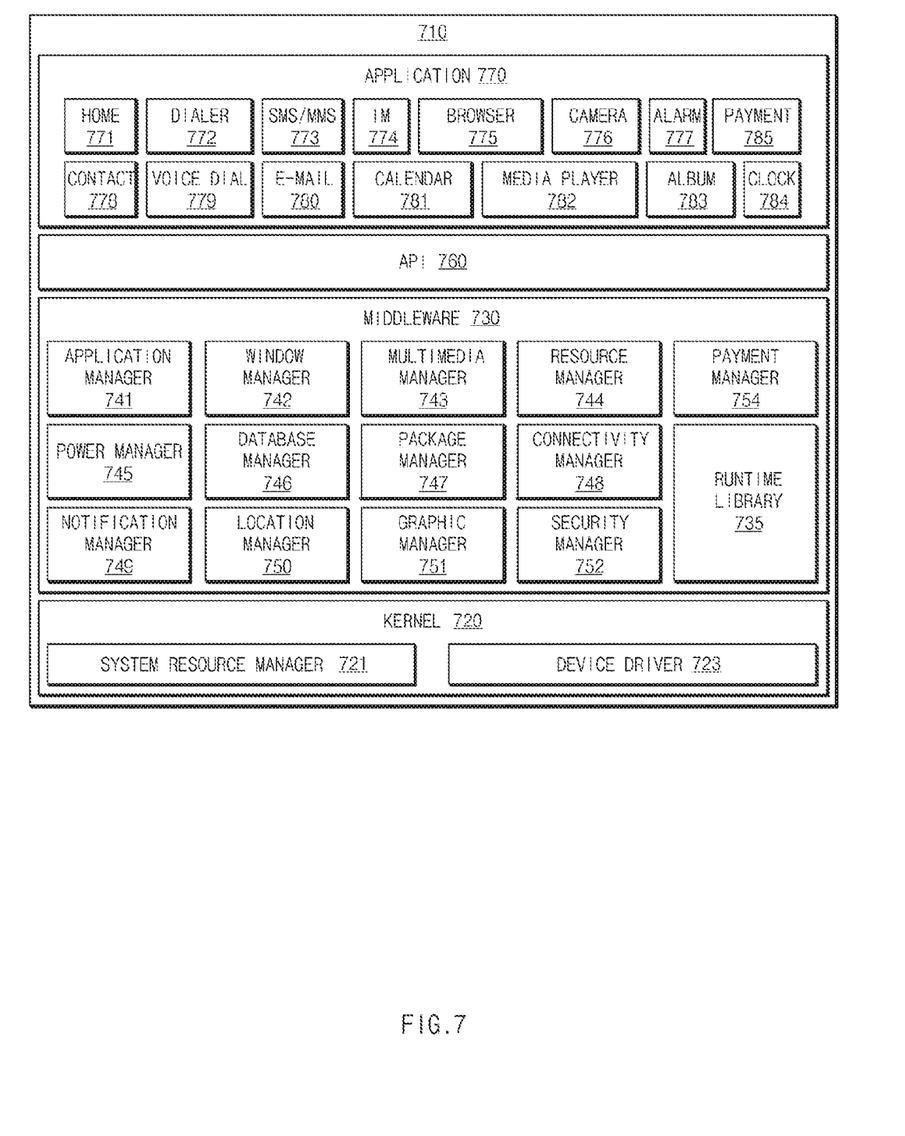
FIG. 7 illustrates a block diagram of a program module, according to various embodiments.

FIGS. 5 to 7 illustrate expansion for a hardware/software element applicable to the above-mentioned electronic device 100.

FIG. 5 illustrates a block diagram of an electronic device in a network environment, according to various embodiments.

Referring to FIG. 5, according to various embodiments, an electronic device 501, a first electronic device 502, a second electronic device 504 or a server 506 may be connected with each other over a network 562 or a short range communication 564. The electronic device 501 may include a bus 510, a processor 520, a memory 530, an input/output interface 550, a display 560, and a communication interface 570. According to an embodiment, the electronic device 501 may not include at least one of the above-described elements or may further include other element(s).

For example, the bus 510 may interconnect the above-described elements 510 to 570 and may include a circuit for conveying communications (e.g., a control message and/or data) among the above-described elements.

The processor 520 may include one or more of a Central Processing Unit (CPU), an Application Processor (AP), or a Communication Processor (CP). For example, the processor 520 may perform an arithmetic operation or data processing associated with control and/or communication of at least one other element(s) of the electronic device 501.

The memory 530 may include a volatile and/or nonvolatile memory. For example, the memory 530 may store instructions or data associated with at least one other element(s) of the electronic device 501. According to an embodiment, the memory 530 may store software and/or a program 540. The program 540 may include, for example, a kernel 541, a middleware 543, an application programming interface (API) 545, and/or an application program (or "an application") 547. At least a part of the kernel 541, the middleware 543, or the API 545 may be referred to as an "operating system (OS)".

For example, the kernel 541 may control or manage system resources (e.g., the bus 510, the processor 520, the memory 530, and the like) that are used to execute operations or functions of other programs (e.g., the middleware 543, the API 545, and the application program 547). Furthermore, the kernel 541 may provide an interface that allows the middleware 543, the API 545, or the application program 547 to access discrete elements of the electronic device 501 so as to control or manage system resources.

The middleware 543 may perform, for example, a mediation role such that the API 545 or the application program 547 communicates with the kernel 541 to exchange data.

Furthermore, the middleware 543 may process one or more task requests received from the application program 547 according to a priority. For example, the middleware 543 may assign the priority, which makes it possible to use a system resource (e.g., the bus 510, the processor 520, the memory 530, or the like) of the electronic device 501, to at least one of the application program 547. For example, the middleware 543 may process the one or more task requests according to the priority assigned to the at least one of the application program 547, which makes it possible to perform scheduling or load balancing on the one or more task requests.

The API 545 may be, for example, an interface through which the application program 547 controls a function provided by the kernel 541 or the middleware 543, and may include, for example, at least one interface or function (e.g., an instruction) for a file control, a window control, image processing, a character control, or the like.

The input/output interface 550 may play a role, for example, of an interface which transmits an instruction or data input from a user or another external device, to other element(s) of the electronic device 501. Furthermore, the input/output interface 550 may output an instruction or data, received from other element(s) of the electronic device 501, to a user or another external device.

The display 560 may include, for example, a Liquid Crystal Display (LCD), a Light-Emitting Diode (LED) display, an Organic LED (OLED) display, a microelectromechanical systems (MEMS) display, or an electronic paper display. The display 560 may display, for example, various contents (e.g., a text, an image, a video, an icon, a symbol, and the like) to a user. The display 560 may include a touch screen and may receive, for example, a touch, gesture, proximity, or hovering input using an electronic pen or a part of a user's body.

For example, the communication interface 570 may establish communication between the electronic device 501 and an external device (e.g., the first electronic device 502, the second electronic device 504, or the server 506). For example, the communication interface 570 may be connected to the network 562 over wireless communication or wired communication to communicate with an external device (e.g., the second electronic device 504 or the server 506).

The wireless communication may use at least one of, for example, Long-Term Evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 564. The short range communication 564 may include, for example, at least one of Wireless Fidelity (Wi-Fi), Bluetooth, Near Field Communication (NFC), Magnetic Stripe Transmission (MST), and GNSS.

The MST may generate a pulse in response to transmission data using an electromagnetic signal, and the pulse may generate a magnetic field signal. The electronic device 501 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 562 may include at least one of telecommunications networks, for example, a computer network (e.g., LAN or WAN), an Internet, or a telephone network.

Each of the first and second electronic devices 502 and 504 may be a device of which the type is different from or the same as that of the electronic device 501. According to an embodiment, the server 506 may include a group of one or more servers. According to various embodiments, all or a portion of operations that the electronic device 501 will perform may be executed by another or plural electronic devices (e.g., the first electronic device 502, the second electronic device 504, or the server 506). According to an embodiment, in the case where the electronic device 501 executes any function or service automatically or in response to a request, the electronic device 501 may not perform the function or the service internally, but, alternatively additionally, it may request at least a portion of a function associated with the electronic device 501 at other electronic device (e.g., the first electronic device 502, the second electronic device 504, or the server 506). The other electronic device may execute the requested function or additional function and may transmit the execution result to the electronic device 501. The electronic device 501 may provide the requested function or service using the received result or may additionally process the received result to provide the requested function or service. To this end, for example, cloud computing, distributed computing, or client-server computing may be used.

FIG. 6 illustrates a block diagram of an electronic device, according to various embodiments.

Referring to FIG. 6, an electronic device 601 may include, for example, all or a part of the electronic device 501 illustrated in FIG. 5. The electronic device 601 may include one or more processors (e.g., an application processor; AP) 610, a communication module 620, a subscriber identification module 629, a memory 630, a sensor module 640, an input device 650, a display 660, an interface 670, an audio module 680, a camera module 691, a power management module 695, a battery 696, an indicator 697, and a motor 698.

The processor 610 may drive, for example, an operating system (OS) or an application to control a plurality of hardware or software elements connected to the processor 610 and may process and compute a variety of data. For example, the processor 610 may be implemented with a System on Chip (SoC). According to an embodiment, the processor 610 may further include a graphic processing unit (GPU) and/or an image signal processor. The processor 610 may include at least a part (e.g., a cellular module 621) of elements illustrated in FIG. 6. The processor 610 may load an instruction or data, which is received from at least one of other elements (e.g., a nonvolatile memory), into a volatile memory and process the loaded instruction or data. The processor 610 may store a variety of data in the nonvolatile memory.

The communication module 620 may be configured the same as or similar to the communication interface 570 of FIG. 5. The communication module 620 may include the cellular module 621, a Wi-Fi module 622, a Bluetooth (BT) module 623, a GNSS module 624 (e.g., a GPS module, a Glonass module, a Beidou module, or a Galileo module), a near field communication (NFC) module 625, a MST module 626, and a radio frequency (RF) module 627.

The cellular module 621 may provide, for example, voice communication, video communication, a character service, an Internet service, or the like over a communication network. According to an embodiment, the cellular module 621 may perform discrimination and authentication of the electronic device 601 within a communication network by using the subscriber identification module (e.g., a SIM card) 629. According to an embodiment, the cellular module 621 may perform at least a portion of functions that the processor 610 provides. According to an embodiment, the cellular module 621 may include a communication processor (CP).

Each of the Wi-Fi module 622, the BT module 623, the GNSS module 624, the NFC module 625, or the MST module 626 may include a processor for processing data exchanged through a corresponding module, for example. According to an embodiment, at least a part (e.g., two or more) of the cellular module 621, the Wi-Fi module 622, the BT module 623, the GNSS module 624, the NFC module 625, or the MST module 626 may be included within one Integrated Circuit (IC) or an IC package.

For example, the RF module 627 may transmit and receive a communication signal (e.g., an RF signal). For example, the RF module 627 may include a transceiver, a power amplifier module (PAM), a frequency filter, a low noise amplifier (LNA), an antenna, or the like. According to another embodiment, at least one of the cellular module 621, the Wi-Fi module 622, the BT module 623, the GNSS module 624, the NFC module 625, or the MST module 626 may transmit and receive an RF signal through a separate RF module.

The subscriber identification module 629 may include, for example, a SIM card and/or embedded SIM that includes a subscriber identification module and may include unique identify information (e.g., integrated circuit card identifier (ICCID)) or subscriber information (e.g., international mobile subscriber identity (IMSI)).

The memory 630 (e.g., the memory 530) may include an internal memory 632 or an external memory 634. For example, the internal memory 632 may include at least one of a volatile memory (e.g., a dynamic random access memory (DRAM), a static RAM (SRAM), a synchronous DRAM (SDRAM), or the like), nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 634 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 634 may be operatively and/or physically connected to the electronic device 601 through various interfaces.

A security module 636 may be a module that includes a storage space of which a security level is higher than that of the memory 630 and may be a circuit that guarantees safe data storage and a protected execution environment. The security module 636 may be implemented with a separate circuit and may include a separate processor. For example, the security module 636 may be in a smart chip or a secure digital (SD) card, which is removable, or may include an embedded secure element (eSE) embedded in a fixed chip of the electronic device 601. Furthermore, the security module 636 may operate based on an operating system (OS) that is different from the OS of the electronic device 601. For example, the security module 636 may operate based on java card open platform (JCOP) OS.

The sensor module 640 may measure, for example, a physical quantity or may detect an operation state of the electronic device 601. The sensor module 640 may convert the measured or detected information to an electric signal. For example, the sensor module 640 may include at least one of a gesture sensor 640A, a gyro sensor 640B, a barometric pressure sensor 640C, a magnetic sensor 640D, an acceleration sensor 640E, a grip sensor 640F, the proximity sensor 640G, a color sensor 640H (e.g., red, green, blue (RGB) sensor), a biometric sensor 640I, a temperature/humidity sensor 640J, an illuminance sensor 640K, or an UV sensor 640M. Although not illustrated, additionally or generally, the sensor module 640 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 640 may further include a control circuit for controlling at least one or more sensors included therein. According to an embodiment, the electronic device 601 may further include a processor that is a part of the processor 610 or independent of the processor 610 and is configured to control the sensor module 640. The processor may control the sensor module 640 while the processor 610 remains at a sleep state.

The input device 650 may include, for example, a touch panel 652, a (digital) pen sensor 654, a key 656, or an ultrasonic input unit 658. For example, the touch panel 652 may use at least one of capacitive, resistive, infrared and ultrasonic detecting methods. Also, the touch panel 652 may further include a control circuit. The touch panel 652 may further include a tactile layer to provide a tactile reaction to a user.

The (digital) pen sensor 654 may be, for example, a part of a touch panel or may include an additional sheet for recognition. The key 656 may include, for example, a physical button, an optical key, or a keypad. The ultrasonic input device 658 may detect (or sense) an ultrasonic signal, which is generated from an input device, through a microphone (e.g., a microphone 688) and may check data corresponding to the detected ultrasonic signal.

The display 660 (e.g., the display 560) may include a panel 662, a hologram device 664, or a projector 666. The panel 662 may be the same as or similar to the display 560 illustrated in FIG. 5. The panel 662 may be implemented, for example, to be flexible, transparent or wearable. The panel 662 and the touch panel 652 may be integrated into a single module. The hologram device 664 may display a stereoscopic image in a space using a light interference phenomenon. The projector 666 may project light onto a screen so as to display an image. For example, the screen may be arranged in the inside or the outside of the electronic device 601. According to an embodiment, the display 660 may further include a control circuit for controlling the panel 662, the hologram device 664, or the projector 666.

The interface 670 may include, for example, a high-definition multimedia interface (HDMI) 672, a universal serial bus (USB) 674, an optical interface 676, or a D-sub-miniature (D-sub) 678. The interface 670 may be included, for example, in the communication interface 570 illustrated in FIG. 5. Additionally or generally, the interface 670 may include, for example, a mobile high definition link (MHL) interface, a SD card/multi-media card (MMC) interface, or an infrared data association (IrDA) standard interface.

The audio module 680 may convert a sound and an electric signal in dual directions. At least a part of the audio module 680 may be included, for example, in the input/output interface 550 illustrated in FIG. 5. The audio module 680 may process, for example, sound information that is input or output through a speaker 682, a receiver 684, an earphone 686, or the microphone 688.

For example, the camera module 691 may shoot a still image or a video. According to an embodiment, the camera module 691 may include at least one or more image sensors (e.g., a front sensor or a rear sensor), a lens, an image signal processor (ISP), or a flash (e.g., an LED or a xenon lamp).

The power management module 695 may manage, for example, power of the electronic device 601. According to an embodiment, a power management integrated circuit (PMIC), a charger IC, or a battery or fuel gauge may be included in the power management module 695. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 696 and a voltage, current or temperature thereof while the battery is charged. The battery 696 may include, for example, a rechargeable battery and/or a solar battery.

The indicator 697 may display a specific state of the electronic device 601 or a part thereof (e.g., the processor 610), such as a booting state, a message state, a charging state, and the like. The motor 698 may convert an electrical signal into a mechanical vibration and may generate the following effects: vibration, haptic, and the like. Although not illustrated, a processing device (e.g., a GPU) for supporting a mobile TV may be included in the electronic device 601. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

FIG. 7 illustrates a block diagram of a program module, according to various embodiments.

According to an embodiment, a program module 710 (e.g., the program 540) may include an operating system (OS) to control resources associated with an electronic device (e.g., the electronic device 501), and/or diverse applications (e.g., the application program 547) driven on the OS. The OS may be, for example, Android, iOS, Windows, Symbian, or Tizen.

The program module 710 may include a kernel 720, a middleware 730, an application programming interface (API) 760, and/or an application 770. At least a portion of the program module 710 may be preloaded on an electronic device or may be downloadable from an external electronic device (e.g., the first electronic device 502, the second electronic device 504, the server 506, or the like).

The kernel 720 (e.g., the kernel 541) may include, for example, a system resource manager 721 or a device driver 723. The system resource manager 721 may control, allocate, or retrieve system resources. According to an embodiment, the system resource manager 721 may include a process managing unit, a memory managing unit, a file system managing unit, or the like. The device driver 723 may include, for example, a display driver, a camera driver, a Bluetooth driver, a shared memory driver, a USB driver, a keypad driver, a Wi-Fi driver, an audio driver, or an inter-process communication (IPC) driver.

The middleware 730 may provide, for example, a function that the application 770 needs in common, or may provide diverse functions to the application 770 through the API 760 to allow the application 770 to efficiently use limited system resources of the electronic device. According to an embodiment, the middleware 730 (e.g., the middleware 543) may include at least one of a runtime library 735, an application manager 741, a window manager 742, a multimedia manager 743, a resource manager 744, a power manager 745, a database manager 746, a package manager 747, a connectivity manager 748, a notification manager 749, a location manager 750, a graphic manager 751, a security manager 752, or a payment manager 754.

The runtime library 735 may include, for example, a library module that is used by a compiler to add a new function through a programming language while the application 770 is being executed. The runtime library 735 may perform input/output management, memory management, or capacities management about arithmetic functions.

The application manager 741 may manage, for example, a life cycle of at least one application of the application 770. The window manager 742 may manage a graphic user interface (GUI) resource that is used in a screen. The multimedia manager 743 may identify a format necessary for playing diverse media files, and may perform encoding or decoding of media files by using a codec suitable for the format. The resource manager 744 may manage resources such as a storage space, memory, or source code of at least one application of the application 770.

The power manager 745 may operate, for example, with a basic input/output system (BIOS) to manage a battery or power, and may provide power information for an operation of an electronic device. The database manager 746 may generate, search for, or modify database that is to be used in at least one application of the application 770. The package manager 747 may install or update an application that is distributed in the form of package file.

The connectivity manager 748 may manage, for example, wireless connection such as Wi-Fi or Bluetooth. The notification manager 749 may display or notify an event such as arrival message, appointment, or proximity notification in a mode that does not disturb a user. The location manager 750 may manage location information about an electronic device. The graphic manager 751 may manage a graphic effect that is provided to a user, or manage a user interface relevant thereto. The security manager 752 may provide a general security function necessary for system security, user authentication, or the like. According to an embodiment, in the case where an electronic device (e.g., the electronic device 501) includes a telephony function, the middleware 730 may further include a telephony manager for managing a voice or video call function of the electronic device.

The middleware 730 may include a middleware module that combines diverse functions of the above-described elements. The middleware 730 may provide a module specialized to each OS kind to provide differentiated functions. Additionally, the middleware 730 may dynamically remove a part of the preexisting elements or may add new elements thereto.

The API 760 (e.g., the API 545) may be, for example, a set of programming functions and may be provided with a configuration that is variable depending on an OS. For example, in the case where an OS is the Android or the iOS, it may provide one API set per platform. In the case where an OS is the Tizen, it may provide two or more API sets per platform.

The application 770 (e.g., the application program 547) may include, for example, one or more applications capable of providing functions for a home 771, a dialer 772, an SMS/MMS 773, an instant message (IM) 774, a browser 775, a camera 776, an alarm 777, a contact 778, a voice dial 779, an e-mail 780, a calendar 781, a media player 782, an album 783, a timepiece 784, a payment 785, health care (e.g., measuring an exercise quantity, blood sugar, or the like), or offering of environment information (e.g., information of barometric pressure, humidity, temperature, or the like).

According to an embodiment, the application 770 may include an application (hereinafter referred to as "information exchanging application" for descriptive convenience) to support information exchange between an electronic device (e.g., the electronic device 501) and an external electronic device (e.g., the first electronic device 502 or the second electronic device 504). The information exchanging application may include, for example, a notification relay application for transmitting specified information to the external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from the external electronic device and provide the notification information to a user.

The device management application may manage (e.g., install, delete, or update), for example, at least one function (e.g., turn-on/turn-off of an external electronic device itself (or a part of components) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 770 may include an application (e.g., a health care application of a mobile medical device) that is assigned in accordance with an attribute of an external electronic device. According to an embodiment, the application 770 may include an application that is received from the external electronic device (e.g., the first electronic device 502, the second electronic device 504, and the server 506). According to an embodiment, the application 770 may include a preloaded application or a third party application that is downloadable from a server. The names of elements of the program module 710 according to the embodiment may be modifiable depending on kinds of operating systems.

According to various embodiments, at least a portion of the program module 710 may be implemented by software, firmware, hardware, or a combination of two or more thereof. At least a portion of the program module 710 may be implemented (e.g., executed), for example, by the processor (e.g., the processor 610). At least a portion of the program module 710 may include, for example, modules, programs, routines, sets of instructions, processes, or the like for performing one or more functions.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 520), may cause the one or more processors to perform a function corresponding to the instruction. The computer-readable storage media, for example, may be the memory 530.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

According to embodiments disclosed in the present disclosure, the electronic device may save power consumption depending on an unnecessary network search operation and the transmission of the control message. Further, in view of an MNO, network load generated when the electronic device attempts to continue performing network registration may be reduced by disabling a network search function.

In addition, a variety of effects directly or indirectly ascertained through the present disclosure may be provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device, comprising:
   an embedded universal integrated circuit card (eUICC); and
   at least one processor operably connected to the eUICC,
   wherein when there is no enabled profile in the eUICC, the eUICC is configured to transmit a status word to the at least one processor, the status word indicates that there is no the enabled profile in the eUICC,
   wherein the at least one processor is configured to:
      manage a profile stored in the eUICC to determine whether the profile is an enabled profile,
      determine that there is no enabled profile in response to receiving the status word from the eUICC,
      when there is an enabled profile in the eUICC, perform a communication function based on the enabled profile; and
      when there is no enabled profile in the eUICC, disable at least one of a periodic eUICC verification function and a network search function.

2. The electronic device of claim 1, wherein:
   the eUICC is further configured to provide a file system to the at least one processor, and
   when information included in the file system meets a condition, the at least one processor is further configured to determine that there is no the enabled profile in the eUICC.

3. The electronic device of claim 2, wherein, when an elementary file integrated circuit card identifier (EF_ICCID) information of the file system meets the condition, the at least one processor is further configured to determine that the file system is a default file system when there is no enabled profile in the eUICC.

4. The electronic device of claim 2, wherein the information included in the file system corresponds to an international mobile subscriber identify (IMSI) value.

5. The electronic device of claim 4, wherein:
   the at least one processor is further configured to transmit a command to the eUICC,
   the eUICC is further configured to transmit a profile list for a profile installed in the eUICC to the at least one processor in response to the command, and the at least one processor is further configured to determine whether there is the enabled profile in the eUICC based on the profile list.

6. The electronic device of claim 5, wherein the profile list comprises the profile installed in the eUICC and information about an enabled or disabled state of the profile.

7. The electronic device of claim 6, wherein, when all profiles in the profile list are disabled, the at least one processor is further configured to determine that there is no enabled profile in the eUICC.

8. The electronic device of claim 6, wherein, when all profiles included in the profile list are disabled or when there is no profile stored in the eUICC, the at least one processor is further configured to determine that there is no enabled profile in the eUICC.

9. The electronic device of claim 1, further comprising:
a memory configured to be operably connected with the at least one processor,
wherein the at least one processor is further configured to:
store a profile list database for a profile installed in the eUICC in the memory, and
determine whether the enabled profile is stored in the eUICC based on the profile list database.

10. The electronic device of claim 1, wherein:
the at least one processor further comprises an application processor and a communication processor,
the at least one processor further comprises a local profile assistant (LPA) and a subscriber identity module (SIM) manager, and
the LPA is implemented by the application processor and the communication processor and the SIM manager is implemented by the communication processor.

11. A method for operating a terminal having an eUICC, the method comprising:
transmitting to a processor of the terminal by the eUICC, a status word, when there is no enabled profile in the eUICC;
determining, by the processor, whether there is an enabled profile in the eUICC;
determining, by the processor, that there is no enabled profile in response to receiving the status word from the eUICC;
when there is an enabled profile in the eUICC, performing, by the processor, a communication function based on the enabled profile; and
when there is no enabled profile in the eUICC, disabling, by the processor, at least one of a eUICC verification function and a network search function.

12. The method of claim 11, wherein determining whether there is the enabled profile in the eUICC, the method comprises:
obtaining a file system from the eUICC; and
determining whether information included in the file system meets a condition.

13. The method of claim 11, further comprising:
disabling a periodic network search function when there is no enabled profile in the eUICC.

14. The method of claim 13, wherein the disabling the periodic network search function comprises:
disabling a function of searching for radio access technology (RAT) available in a state where the terminal receives a communication service limited due to limited camping.

15. An electronic device, comprising:
an application processor;
a communication processor;
a radio frequency (RF) circuit operably connected with the communication processor; and
an eUICC operably connected with the application processor, the communication processor, and the RF circuit, wherein the eUICC is configured to:
store at least one profile received from a server via the RF circuit, and
when there is no enabled profile in the eUICC, transmit a status word to the communication processor, wherein the status word indicates that there is no the enabled profile in the eUICC,
wherein the communication processor is configured to:
determine if there is an enabled profile in the eUICC,
determine there is no enabled profile in response to receiving a status word from the eUICC, and
when there is no enabled profile in the eUICC, disable at least one of a periodic eUICC verification function and a network search function.

16. The electronic device of claim 15, wherein:
the eUICC is further configured to provide a file system of an enabled profile among the at least one profile stored in the eUICC to the communication processor, and
the communication processor is further configured to perform a communication function via the RF circuit based on information stored in the file system.

17. The electronic device of claim 15, wherein:
the eUICC is further configured to, when there is no enabled profile in the eUICC, provide a default file system to the communication processor, and
the communication processor is further configured to, when information included in the default file system meets a condition, disable at least one of the periodic eUICC verification function and a network search function.

18. The electronic device of claim 17, wherein the information included in the default file system corresponds to a public land mobile network (PLMN) identifier (ID).

19. The electronic device of claim 17, wherein the information included in the default file system corresponds to an elementary file integrated circuit card identifier (EF_ICCID) information.

* * * * *